H. HACKSTEDDE.
MIXING MACHINE.
APPLICATION FILED MAY 8, 1911.
1,085,730.
Patented Feb. 3, 1914.
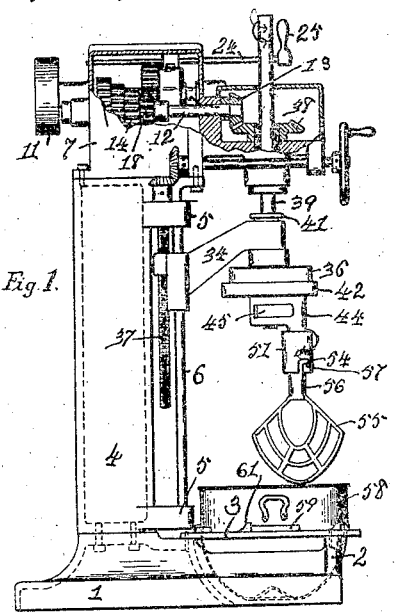
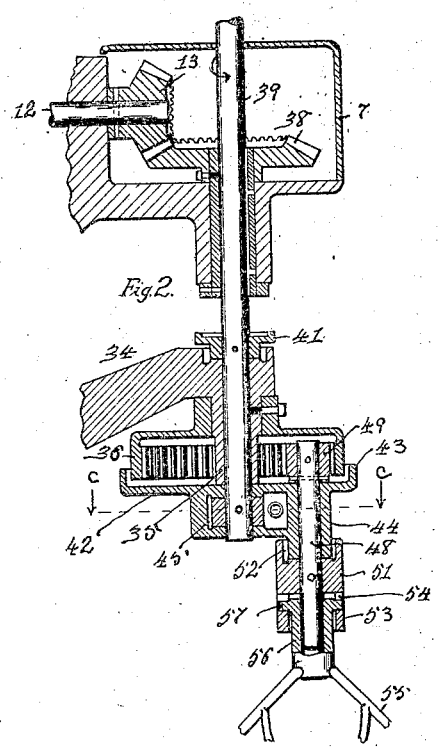
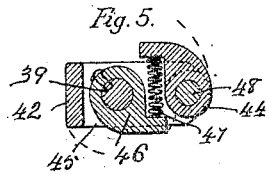
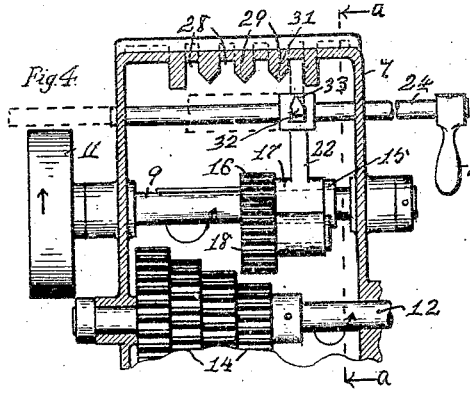
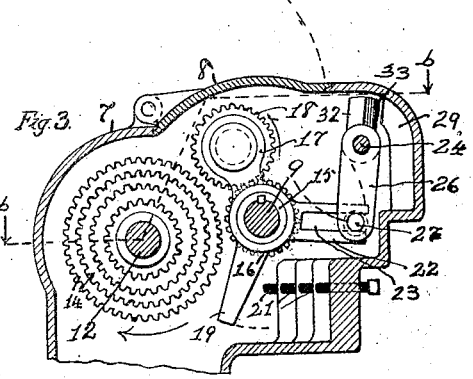
Witnesses
E. E. Lundin
G. J. Bradley
Inventor
Herbert Hackstedde.
By Robert S. Carr,
ATTY.

UNITED STATES PATENT OFFICE.

HERBERT HACKSTEDDE, OF CINCINNATI, OHIO, ASSIGNOR TO THE TRIUMPH MANUFACTURING COMPANY, OF CINCINNATI, OHIO, A CORPORATION OF OHIO.

MIXING-MACHINE.

1,085,730.  Specification of Letters Patent.  Patented Feb. 3, 1914.

Application filed May 8, 1911. Serial No. 625,894.

*To all whom it may concern:*

Be it known that I, HERBERT HACKSTEDDE, a citizen of the United States, residing at Cincinnati, Ohio, have invented a new and useful Improvement in Mixing-Machines, of which the following is a specification.

My invention relates to mixing machines adapted for use in mixing cake ingredients or other suitable material, and the objects of my improvements are to provide means for adjusting the relative position of the mixing blade and the bowl; means for preventing the rotative movement of the bowl in its support; means for preventing the oil from dripping into the bowl; means for detachably engaging the mixing blade with its shaft; to provide yielding driving connections with the mixing blade; to provide means for accurately registering the corresponding speed changing gears with each other; to provide the casing with a hinged door for deadening the noise of the gears, and to provide simple and durable construction and assemblage of the various parts for securing facility of operation and efficiency of action. These objects may be attained in the following described manner as illustrated in the accompanying drawings, in which:—

Figure 1 is a side elevation with parts in section of a mixing machine embodying my improvements; Fig. 2 a vertical section in the plane of the driving shaft with parts broken away; Fig. 3 a transverse section on the line *a—a* of Fig. 4; Fig. 4 a horizontal section on the broken line *b—b* of Fig. 3 and Fig. 5 a horizontal section on the line *c—c* of Fig. 2.

In the drawings, 1 represents the base formed with supports 2 for the bowl ring 3. A column 4 formed with lugs 5 wherein guide rods 6 are secured is supported on the base. A gear casing 7 provided with a base. A hinged lid 8 is mounted on the column and projects over the bowl ring. The driving shaft 9 journaled in the casing is provided with a pulley 11 and the driven shaft 12, also journaled in the casing, is provided with a bevel pinion 13 and with a cone of gears 14. A sleeve 15 splined on the driving shaft is provided with a pinion 16 and journaled in the tumbler 17 which carries a tumbler gear 18 in engagement with pinion 16 and adapted to engage with the cone gears. Said tumbler is formed with a radial arm 19 adapted to contact with the adjustable stops 21 for limiting the mesh of the tumbler gear with the cone gears. Said tumbler is also formed with the radial arm 22 which contains an open slot 23. A sliding rod 24 journaled in the casing is provided with a handle 25 and with an arm 26 which is slidably engaged with the slot 23 in arm 22 by means of the headed pin 27. Said rod serves to move the tumbler with the sleeve 15 longitudinally on the driving shaft and also for turning the tumbler with the tumbler gear into or out of engagement with the cone gears for changing the speed of the driven shaft.

Grooves 28 corresponding in number with the cone gears are formed in the wall of the casing between ribs 29 which are tapered at their upper end to an edge 31. A lug 32 on arm 26 is tapered to an edge 33 for facilitating its entrance to the grooves 28 for maintaining the tumbler with the tumbler gear in proper registration with the corresponding cone gears. A bracket 34 formed with a depending sleeve 35 whereon an internal gear 36 is secured is vertically adjustable on the guide rods 6 by means of the hand actuated screw 37. A bevel gear 38 journaled in the casing engages with the pinion 13 and the spindle 39 splined in said gear is journaled in sleeve 35 and provided with a thrust collar 41 which is recessed to form a drip cup. A disk 42 rotatively adjustable on spindle 39 is formed with an annular flange 43 to serve as a drip cup under the gear 36; it is also formed with an eccentric bearing 44 and with a transverse opening 45. A collar 46 is secured on the spindle within said opening and a compression spring 47 connecting said collar with the disk serves to rotatively carry the disk with the spindle under a yielding pressure. A shaft 48 journaled in bearing 44 is provided with a pinion 49 in engagement with gear 36 and also with a collar 51 which is recessed to form a drip cup 52 under said bearing. Said sleeve is also formed with a depending annular flange 53 which contains oppositely disposed angular slots 54. The mixer blade 55 is provided with a socket shank 56 and adapted to receive the end of shaft 48 therein. Said shank is adapted to telescope within the flange 53 and is formed with oppositely disposed radial lugs 57 adapted to detachably engage with the angular slots 54 for securing the mixer blade on shaft 48 like to a "lantern bottom" or "bayonet" joint. The bowl 58 removably supported in the bowl ring 3 is formed with radial lugs 59 adapted to engage with corresponding bosses 61 formed on said ring for preventing the rotation of the bowl therein with the blade 55.

In operation, the sliding rod serves to engage the tumbler gear with the cone gears for changing the speed of the driven shaft. The engagement of the tapered lug with the grooves in the casing serves to maintain the change speed gears in proper position of registration. The hinged cover on the casing serves to deaden the noise of the gears therein. The hand screw serves to adjust the bracket with the beater in proper vertical relation with the bowl. The weight of the vertically adjustable parts is fixed and they may be counterbalanced if desired in any ordinary manner while the weight of the bowl will vary according to the size of the batch therein. The engagement of the mixer shaft pinion with the stationary internal gear serves to rotate the mixer blade, and the spindle serves to revolve said shaft with the mixer in a circle within the bowl. The yielding connections of the disk with the spindle serves to relieve any sudden shock of the disk and the mixer by the engagement of the speed changing gears. The novel detachable connections of the mixer blade shank with its shaft maintains said blade at all times in perfect alinement with said shaft. The position of the drip cups under the respective bearings catches the waste oil and prevents it from dripping into the bowl.

What I claim as my invention and desire to secure by Letters Patent of the United States is:—

1. In a mixing machine, the combination of a standard supporting the driving gear, a stationary bowl-holding device in the base of the standard, a bracket vertically adjustable on the standard and carrying the beater spindle which is splined to slide vertically through the member of the driving gear by which it is rotated, a disk journaled on the lower end of said spindle and housing a collar which is fixed rigidly to said spindle to maintain the latter in said bracket, a resilient driving connection between said collar and said disk, a beater shaft eccentrically journaled in said disk, and gearing for rotating said shaft.

2. In a mixing machine, the combination of a standard housing the driving gear, a stationary bowl-holding device in the base of the standard, a bracket vertically adjustable on the standard and having a depending sleeve, a ring gear fixed to said sleeve, a beater spindle journaled in said sleeve and having a vertically sliding driving connection with said driving gear, a collar fixed to said spindle and adapted to rotate on said bracket, a disk mounted on the lower end of said spindle and adapted to rotate therewith, a shock absorbing connection between said spindle and said disk, and so mounted as to maintain the spindle in the bracket, a beater shaft journaled in said disk parallel with and eccentric to said spindle, and a gear on said shaft meshing with said ring gear.

HERBERT HACKSTEDDE.

Witnesses:
A. BERTRAM,
ED. W. HECKEL.